United States Patent

[11] 3,592,215

| [72] | Inventor | James W. Davis<br>New Britain, Pa. |
|------|----------|-----------------------------------|
| [21] | Appl. No. | 881,565 |
| [22] | Filed | Dec. 2, 1969 |
| [45] | Patented | July 13, 1971 |
| [73] | Assignee | Fischer & Porter Co.<br>Warminster, Pa. |

[54] AUTOMATIC CHANGEOVER VALVE ASSEMBLY
6 Claims, 4 Drawing Figs.

[52] U.S. Cl. .................................................. 137/113,
137/112
[51] Int. Cl. .................................................. G05d 16/06
[50] Field of Search .................................... 137/111,
112, 113, 118, 119

[56] References Cited
UNITED STATES PATENTS

| 2,966,920 | 1/1961 | Oglesby | 137/113 |
| 3,001,541 | 9/1961 | St. Clair | 137/113 |
| 3,033,220 | 5/1962 | St. Clair | 137/113 |
| 3,508,568 | 4/1970 | Kowalski | 137/112 |

FOREIGN PATENTS

| 1,222,927 | 3/1959 | France | 137/113 |
| 1,310,676 | 10/1961 | France | 137/113 |

*Primary Examiner* — Laverne D Geiger
*Assistant Examiner* — William H Wright
*Attorney* — Michael Ebert ABSTRACT: An automatic changeover valve assembly for controlling the selective withdrawal of fluid from either one of two cylinders or containers, one serving as the main supply source and the other as a standby or reserve source. The valve assembly comprises a Belleville spring supporting a double-ended valve plug within a demand chamber communicating with a demand line. The first plug cooperates with a valve seat mounted on a diaphragm enclosing a first fluid chamber communicating with a supply fluid source, and the second plug cooperates with a valve seat mounted on a diaphragm enclosing a second fluid chamber communicating with a reserve source. Initially, the first plug is displaced from its related diaphragm seat, whereby the supply fluid is admitted into the demand chamber, whereas the second plug is fitted in its related diaphragm seat, whereby flow of reserve fluid is blocked. But when the pressure of the supply fluid drops, this gives rise to a differential pressure between the demand chamber and the reserve fluid chamber which in turn compels the actuating diaphragm to move and causing the Belleville spring to snap and thereby reverse the relationship of the plugs and valve seats.

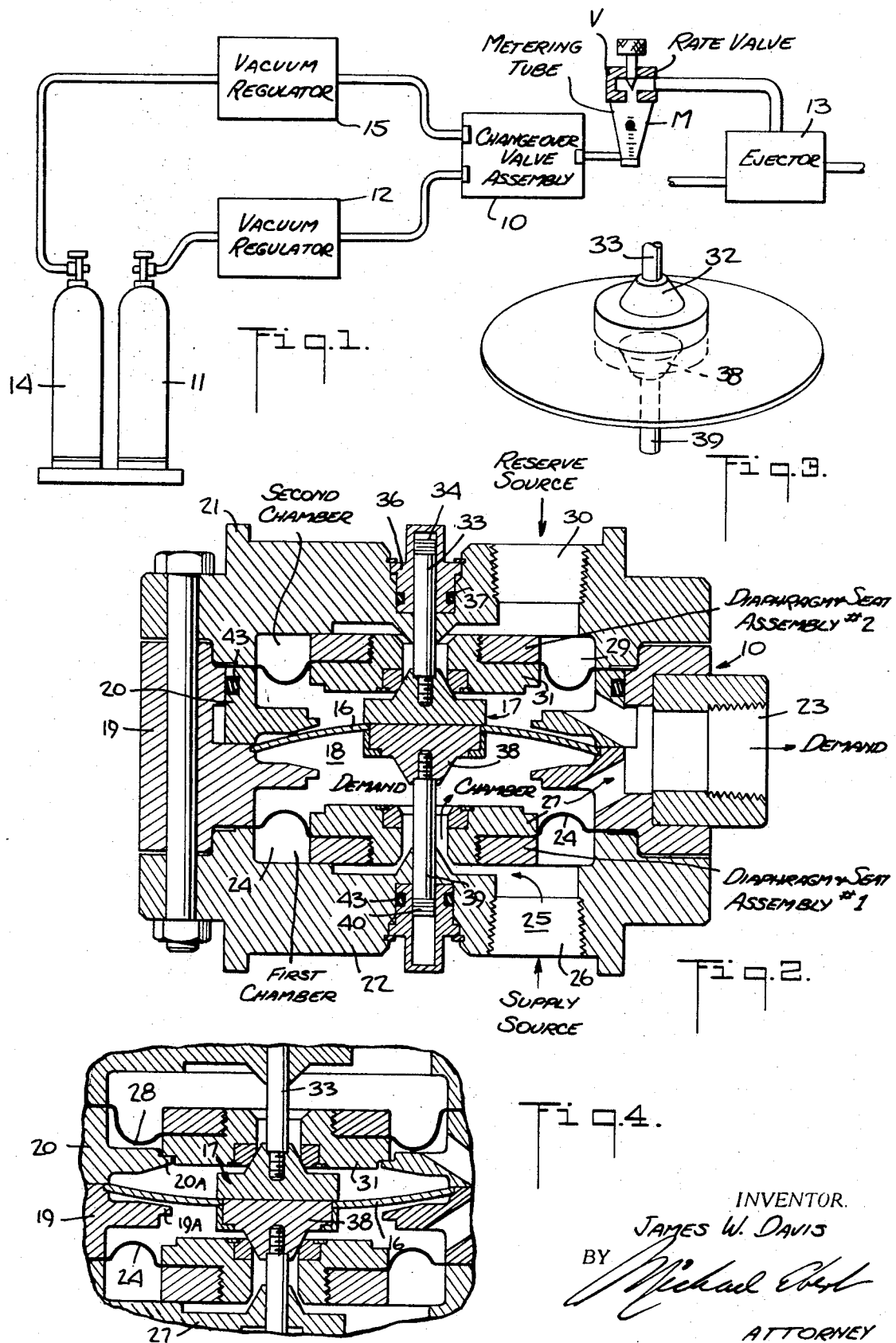

AUTOMATIC CHANGEOVER VALVE ASSEMBLY

BACKGROUND OF INVENTION

This invention relates generally to automatic changeover valve assemblies, and more particularly to an improved valve structure adapted to ensure continuity of fluid flow to a demand line and to prevent the admission of ambient air into the fluid system.

In fluid supply systems, such as those involving gas for domestic use, gas is generally stored in the liquid or gaseous state under relatively high pressure. The present practice in such installations is to have two cylinders of stored gas at all times, one functioning as the service cylinder and the other as the reserve cylinder. Gas is withdrawn only from one cylinder at a time, and when the cylinder in service has been emptied or the pressure therein has dropped to a level below that required, a changeover valve acts automatically to disconnect the exhausted service cylinder from the demand line and to couple the reserve cylinder thereto, which then assumes the role of a service cylinder. The exhausted service cylinder is then replaced by another cylinder which acts as the reserve cylinder.

While diverse changeover valve structures have been used in conjunction with various types of fluid supply systems, such structures are relatively complicated and expensive. As a consequence, many users continue to resort to manual techniques and to rely on pressure indicators to determine when it is necessary to change over to the reserve cylinder upon exhaustion of the supply cylinder. This requires careful attention, for the user must be sure to change over at the right time, just before the pressure in the demand line drops to a point where safety devices and other pressure-responsive appliances coupled to the line have to be reactivated.

Changeover valves are particularly useful in connection with chlorinators for water treatment. In a typical chlorinator, such as that manufactured by Fischer & Porter Co. of Warminster, Penna., chlorine gas from a supply cylinder passes through a vacuum regulator and metering tube and then enters a rate valve which controls the flow. The gas then is fed into an ejector where it mixes with the water to form a chlorinated water solution.

In a chlorination system, it is important that no ambient air containing moisture be admitted to the system, for this may lead to corrosion problems. Moreover, it is vital that valves and other devices used in conjunction with a chlorination system remain sealed in the course of operation so that no chlorine gas is permitted to leak into the atmosphere, for even small quantities of this gas may be dangerous.

In the case of chlorination systems where the standards are very stringent, existing changeover devices fail to satisfy the requirements therefor; they have a relatively short operating life when exposed to chlorine; and are otherwise unsatisfactory.

SUMMARY OF INVENTION

Accordingly, it is the main object of this invention to provide an improved automatic changeover valve assembly adapted to switch fluid flow from a supply source to a reserve source when a predetermined drop occurs in operating pressure whereby, after the valve is actuated and the exhausted source replaced, the source in operation then becomes the supply source and the newly installed source acts as the backup or reserve source.

More particularly, it is an object of the invention to provide a bidirectional, bistable changeover valve assembly which is capable of switching over from a supply source to a reserve source without the need to change pressure regulators associated with the source and without shutting down the system or admitting ambient air therein.

Also an object of the invention is to provide a simple, efficient changeover valve assembly of the above-described type whose internal structure is constituted by materials which are chemically unaffected by the fluid controlled thereby, whereby the assembly has a prolonged, trouble-free life.

Yet another object of the invention is to provide a changeover assembly adapted to indicate which of the two sources coupled thereto is operative, and to sound a warning alarm calling attention to the need to replace the exhausted source.

Briefly stated, these objects are attained in a changeover valve assembly in which a double-ended valve plug is supported on a Belleville spring disposed within a demand chamber communicating with a demand line, which in the case of a chlorinator system, is an ejector. The first plug on one side of the spring cooperates with a valve seat borne on a diaphragm forming the wall of a first fluid chamber. The second plug, on the other side of the spring, cooperates with a valve seat borne on a diaphragm forming the wall of a second fluid chamber. The fluid chambers communicate with fluid sources which in the case of a chlorination system, are constituted by supply and reserve chlorine cylinders.

Initially, the first plug associated with the fluid chamber coupled to the supply source is displaced from its related diaphragm seat, whereby the supply fluid is admitted into the demand chamber through an open supply valve, whereas the second plug, which is associated with the fluid chamber coupled to the reserve source, is fitted in its relative diaphragm seat, whereby the reserve fluid is blocked by the closed reserve valve. But when the pressure of the supply fluid drops, this gives rise to a differential pressure between the demand chamber and the reserve fluid chamber, which overcomes the force of the spring and produces a snap action, thereby opening the reserve valve and shutting the supply valve. The positions of the supply and reserve valves are indicated by plug stems, each of which terminates in a flag which is exposed through a window when the associated plug is fitted into its valve seat.

BRIEF DESCRIPTION OF DRAWING

For a better understanding of the invention as well as other objects and further features thereof, reference is made to the following detailed description to be read in conjunction with the accompanying drawing, wherein:

FIG. 1 is a schematic diagram of a chlorination system using a changeover valve assembly in accordance with the invention;

FIG. 2 is a sectional illustration of a valve assembly in one of its stable states;

FIG. 3 is a perspective view of the Belleville spring incorporated in the assembly; and FIG. 4 is a partial sectional view of the changeover valve assembly as it appears at one point in the course of a transfer operation.

DESCRIPTION OF INVENTION

Referring now to FIG. 1, there is shown a chlorination system incorporating an automatic changeover valve assembly 10 in accordance with the invention. While for purposes of illustration, the assembly will be described in connection with a chlorination system, it is to be understood that it is usable in any fluid supply system involving a primary source and a secondary source, the valve assembly functioning to effect changeover to the secondary source with a decrease in operating pressure of the primary source.

In the chlorination system shown, chlorine is supplied by a service cylinder 11 whose output is coupled to a vacuum regulator 12. In the chlorinator, which may be of the type 70C1700 series made by Fischer & Porter Co., chlorine from the cylinder enters a vacuum regulator where its pressure is reduced to a vacuum. It is then metered before passing through a rate valve which dictates the flow of gas. The gas then flows into an ejector 13, where it mixes with water to form a chlorinated solution. The details of the chlorinator form no part of the present invention.

Also provided is a second chlorine cylinder 14, whose output is fed to a duplicate vacuum regulator 15, cylinder 14 serving as a standby or reserve source. The outputs of vacuum regulators 12 and 15, which normally are at about the same pressure level, are both coupled to changeover valve assembly 10, which provides automatic switching from the supply to the reserve cylinder when the existing supply is exhausted as reflected in a marked reduction in pressure. The output of assembly 10 goes to ejector 13 through a metering tube $M$ and a rate valve $V$. In practice, rate valve $V$ may be located upstream, that is, in advance of assembly 10 rather than downstream as shown.

After changeover is effected, the reserve cylinder assumes the role of the supply source, and the exhausted supply cylinder is replaced with a fresh cylinder which then becomes the reserve source. This sequence takes place without shutting down the system or admitting ambient air therein.

Referring now to FIGS. 2 and 3, the structure of the changeover valve assembly 10 is shown. The assembly includes a Belleville spring 16 having a double-ended plug assembly generally indicated by numeral 17, centrally mounted therein. The Belleville spring consists essentially of a coned or dished disc which tends to flatten out when a load is applied thereto, thereby providing a spring action. The load-deflection characteristics of this spring can be changed by varying the cone height or the thickness of the cone material. For any given spring rate, as the load thereon is increased, the spring continues to deflect until a critical point is reached where the spring snaps and reverses its form.

In the present invention, the load on the spring is applied axially thereto by the double-ended plug assembly in a direction causing the spring to snap when the load reaches the critical point.

Spring 16 is peripherally supported within a demand chamber 18 defined by an annular casing 19 enclosed at either end by end caps 21 and 22. Nested within casing 19 is an annular insert 20. Casing 19 and insert 20 are provided with internal shoulders 19A and 20A which are disposed adjacent the opposing sides of the spring. The demand line, which in the case of the chlorinator system conveys chlorine to ejector 13, communicates with demand chamber 18 through outlet port 23 formed by a bore in casing 19. A fluid seal between casing 19 and insert 20 is effected by O-ring 44 interposed therebetween.

Clamped between casing 19 and end cap 22 is the periphery of a circular diaphragm 24 which in conjunction with the inner walls of the end cap 22, defines a first fluid chamber 25. This chamber is coupled to a first fluid supply source, which in the chlorinator system, is the vacuum regulator 12 coupled to service cylinder 11 through an inlet port 26. Supported on diaphragm 24 and moving therewith is a valve seat 27 which, when unplugged, passes fluid from the first fluid chamber 25 into demand chamber 18. In this way fluid from the supply source, or whatever source is coupled to inlet port 26, is permitted to flow into the demand line through outlet 23.

Clamped between casing 19 and end cap 21 is the periphery of a circular diaphragm 28 identical to diaphragm 24 and defining with the end cap, a second fluid chamber 29. This chamber is coupled through inlet port 30 to a second fluid source serving as the reserve or standby source, which in the case of the system shown in FIG. 1, is chlorinator 15 coupled to cylinder 14. Supported on diaphragm 28 and moving therewith is a valve seat 31 which when unplugged, passes fluid from the second chamber 29 into demand chamber 18. In this way, fluid from the reserve source, or whatever source is coupled to inlet port 30, is permitted to flow into the demand line through outlet 23.

The double-ended plug assembly 11 is constituted on one side of the Belleville spring 16 by a valve plug 32 which is adapted to fit into seat 31. Extending from plug 32 is a stem 33 terminating in an indicator flag 34 which, when the associated plug is seated, is positioned to be visible through a transparent tubular extension 35 formed in a stem guide 36 supported in end cap 21 and sealed therein by O-ring 37. On the other side of the spring, the plug assembly is provided with a valve plug 38 which is adapted to fit into seat 27. While the valve plugs are shown as conical, in practice ball-shaped plugs may be used. Extending from plug 38 is a stem 39 terminating in indicator flag 40, which when the associated plug is seated, is positioned to be visible through a transparent tubular extension 41 formed in a stem guide 42 supported in end cap 22 and sealed therein by O-ring 43.

Insert 20 is provided with a port 20A leading to outlet 23 whereby fluid pressure on both sides of spring 16 is equal, and fluid from inlet port 30 is free to flow into outlet 23 when plug 32 is unseated.

Plug 38 in conjunction with seat 27 constitutes the operating elements of a valve-controlling flow from the supply source, while plug 32 in conjunction with seat 31 constitutes the operating element of a valve-controlling flow from the reserve source, the demand chamber 18 constituting the common output for both valves. Selective bidirectional operation of the two valves is effected by spring 16, which in one stable state holds one valve open, and the other closed; and in the reverse stable state reverses the condition of the valve. Thus the changeover valve assembly is a bidirectional, bistable device.

In FIG. 2, the changeover valve is shown with the valve for the supply source open, and that for the reserve source closed. The pressure from both sources is about equal until the supply source is nearly exhausted, at which point pressure drops sharply. The flow rate of the demand is such that it does not exceed the capacity of the regulators in the chlorinators feeding the changeover valve.

Thus in operation, as the supply source exhausts itself, pressure in demand chamber 18 and in the first fluid chamber 25 drops. This creates a differential pressure between demand chamber 18 and the second fluid chamber 29 coupled to the reserve source, which is at normal pressure. When the resultant force on the diaphragm 28 of the second fluid chamber causes deflection of Belleville spring 16, this diaphragm and the associated seat 31 and plug 32 received therein all move together while maintaining the seal between the valve plug and seat. When the force of diaphragm 28 reaches the critical deflection point of the spring, a snap action occurs which brings about a transfer of valves, thereby opening the reserve valve and closing the supply valve.

As shown in FIG. 4, just after the snap action of the spring takes place, the seat 31 borne on diaphragm 28 makes contact with shoulder 19A which acts as a stop therefor. When pressure in demand chamber 18 is thereafter equalized across diaphragm 28 as a result of fluid entering the chamber from the reserve source, the diaphragm returns to a neutral position against the internal wall of end cap 21. Since the reserve valve is now open and the supply valve closed, the exhausted supply cylinder is replaced with a fresh cylinder which now functions as the reserve, whereas the reserve cylinder in operation assumes the role of the supply source.

When either valve is closed in the changeover structure, its associated flag is visible, for then the plug stem is extended, thereby identifying the source in need of replacement. In order to call attention to the fact that a changeover has taken place and that a new reserve cylinder is required, each plug stem and flag assembly may contain a permanent magnet (sealed within), and a sealed reed switch associated therewith on top of the window. The combination of the magnet and reed switch produces a contact closure when the flag is raised. This contact closure may be used to activate a suitable alarm circuit.

In practice, the Belleville spring and all other components of the changeover valve may be made of synthetic plastic material, such as polypropylene or other material which is structurally strong and chemically inert, so that the valve may be used in a wide range of corrosive environments.

While there has been shown and described a preferred embodiment of automatic changeover valve assembly in accordance with the invention, it will be appreciated that many changes and modifications may be made therein without, however, departing from the essential spirit of the invention.

What I claim is:

1. A changeover valve assembly for selectively feeding fluid from either one of two sources to a demand line, said sources having approximately the same pressure except when one of the sources is nearly exhausted, said assembly comprising:
   A. a demand chamber having an outlet port communicating with said demand line,
   B. a first fluid chamber disposed on one side of said demand chamber and having an inlet port communicating with one of said sources, the interface of said first fluid chamber and said demand chamber being defined by a first diaphragm bearing a valve seat and constituting a first diaphragm assembly,
   C. a second fluid chamber disposed on the opposing side of said demand chamber and having an inlet port communicating with the other source, the interface of said second fluid chamber and said demand chamber being defined by a second diaphragm bearing a valve seat and constituting a second diaphragm assembly, and
   D. a reversible Belleville spring disposed in said demand chamber and having a first plug mounted centrally on one side thereof in cooperative relation to the seat on the first diaphragm assembly and having a second plug mounted centrally on the other side thereof in cooperative relation to the seat on the second diaphragm assembly, each diaphragm assembly, when its seat engages one of said plugs, being subjected to a differential pressure should the pressure in the demand chamber fall below the pressure in the fluid chamber associated therewith, whereby the diaphragm assembly acts to load said spring to cause reversal thereof.

2. An assembly as set forth in claim 1, wherein said Belleville spring is constituted by a conical element.

3. An assembly as set forth in claim 1, wherein said demand chamber is formed by a tubular casing enclosed by end caps, said first and second diaphragms being peripherally clamped between said end caps and said casing to define said fluid chambers.

4. An assembly as set forth in claim 3, wherein said first and second plugs are provided with stems axially movable in guides formed in said end caps.

5. An assembly as set forth in claim 4, wherein said stems terminate in flags which are visible through windows in said bearings.

6. An assembly as set forth in claim 3, wherein said casing is provided with stops on either side of said spring to arrest the movement of the seats on said diaphragm assembly.